Patented Mar. 30, 1937

2,075,107

UNITED STATES PATENT OFFICE 2,075,107

MIXED ESTERS AND PROCESS FOR MAKING THE SAME

Ralph B. Frazier, Swissvale, Pa., assignor, by mesne assignments, to Union Carbide and Carbon Corporation, a corporation of New York No Drawing. Application December 10, 1931, Serial No. 580,228

6 Claims. (Cl. 260—8)

The invention relates to new compositions of matter comprising plastic materials, such as cellulose derivatives, natural and artificial resins and the like, in combination with a new class of substances having useful properties as solvents, softeners, plasticizers, or modifiers for these plastic materials.

I have found that the mixed esters of a polycarboxylic acid in which some of the carboxyl groups are combined with a substantially completely esterified alkylene or polyalkylene glycol of the 1,2 series, that is, so as to include an alkylene or oxyalkylene group in the ester, and in which the remaining carboxyl groups are combined with a monohydroxy alcohol, which term as used in this specification and the appended claims is defined as including alkyl and aryl monohydroxy alcohols and mono alkyl and aryl ethers of alkylene and polyalkylene glycols of the 1,2 series, i. e. oxyalkyl or oxyaryl alcohols, have exceptionally good solvent powers for plastic materials in general. These mixed esters are stable and they possess low vapor pressures, and these properties further enhance their value as plasticizers, softeners and modifiers for plastic materials. The new esters may be represented by the following formula:

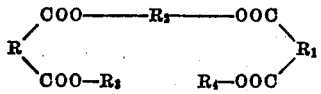

in which R and $R_1$ are alkyl or aryl groups having at least two carboxyl groups attached thereto; $R_2$ is an alkylene or oxyalkylene group; and $R_3$ and $R_4$ are alkyl, aryl, oxyalkyl or oxyaryl groups.

The polycarboxylic acid in the new compounds may be an aliphatic acid, such as succinic or citric acid; it may be an aromatic acid, such as phthalic acid; or it may be a modified acid of either type, such as tartaric acid or p-chlorophthalic acid.

The monohydroxy alcohol may be an aliphatic alcohol, such as methanol, ethanol or isopropanol; an aromatic alcohol, such as benzyl or naphthyl alcohol; a modified alcohol of either type, such as mono-chlor ethanol or p-amino benzyl alcohol; or it may be a mono alkyl or aryl ether of an alkylene or polyalkylene glycol of the 1,2 series in which the substituted ether group may be of the same group as the monohydroxy alcohols listed above.

The alkylene and polyalkylene glycols of the 1,2 series are well known: ethylene glycol, $CH_2OH.CH_2OH$, diethylene glycol, $$CH_2OH.CH_2.O.CH_2.CH_2OH,$$

and 1,2 propylene glycol, $CH_2OH.CHOH.CH$ are typical members of this class of compounds.

I prepare the compounds of my invention by replacing the hydrogen of one or more carboxyl groups of polycarboxylic acid with an alkylene or polyalkylene glycol of the 1,2 series by reaction of the two compounds in such a manner as to cause the esterification of substantially all of the hydroxyl groups of the glycol or polyglycol, and by then replacing the hydrogen on the remaining carboxyl group or groups of the acid by the reaction with a monohydroxy compound of the group described. This preparation may be conducted in any suitable apparatus and such esterification reactions are known to the art. For example, the ester may be prepared by the simple reaction of the carboxyl groups with hydroxyl groups with the elimination of water, as $R.COOH + HO.R' = R.COO.R' + H_2O$; by the reaction of the anhydride of the polycarboxylic acid with hydroxyl groups, as $$R.(CO)_2O + HO.R' = R.COOH.COOR';$$

or by the reaction of a metallic salt of the polycarboxylic acid with an alkyl or aryl halide, as $$R.COONa + Cl.R' = R.COO.R' + NaCl,$$

or $$R.(COO)_2Ca + 2Cl.R' = R.(COOR')_2 + CaCl_2;$$

or in general by any reaction which yields compounds of the general type expressed by $R.COO.R'$. Known esterification catalysts, such as sulfuric acid, benzene sulfonic acid, pyridine, diethyl amine, etc. may or may not be used in effecting the reaction.

The general procedure which I used in preparing the compounds of this invention is illustrated by the following example:

Ethylene glycol dihydrogen diphthalate

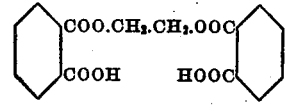

was prepared by heating 1 mol. of ethylene glycol with 2 mols. of phthalic anhydride at 170° C. for about three hours. The reaction takes place at a somewhat lower temperature in the presence of pyridine as a catalyst. The resulting product may be purified if desired by recrystallization from a suitable solvent, such as water or alcohol. The ethylene glycol dihydrogen diphthalate was then esterified with an excess of beta-butoxy ethanol (ethylene glycol monobutyl ether),

The water formed in this reaction was removed by continuous distillation with benzene in such manner that benzene was separated from the distillate and returned continuously to the reaction. This esterification was continued until the compound was substantially neutral. The benzene and excess monobutyl ether were then removed from the product by distillation in vacuo. The resulting product which I call di-beta-butoxy ethyl ethylene glycol diphthalate, was heavy oil-like liquid which was pale straw in color, and it may be represented by the formula

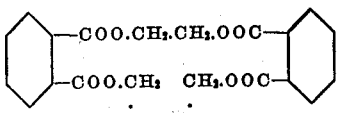

It is to be understood that many variations in the procedure described may be employed. For instance, I may form the ethylene glycol monobutyl ether hydrogen phthalate and link two molecules of this acid ester by esterification with ethylene glycol, thereby forming the compound described above.

Other compounds which may be prepared by this process are typified by the following:

Di-beta-ethoxy ethyl diethylene glycol diphthalate

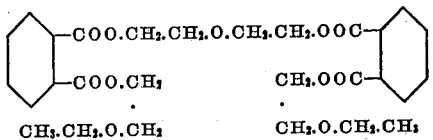

Dibutyl ethylene glycol diphthalate

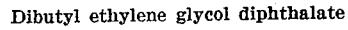
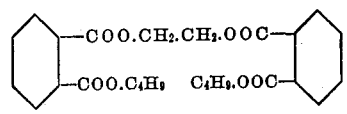

More than one monohydroxy compound may be present in the ester, for example, butyl acid phthalate and beta-ethoxy ethyl acid phthalate may be separately prepared and the two molecules may be then linked by esterification with a glycol of the 1,2 series, such as ethylene glycol. The resultant ester has the following probable formula:

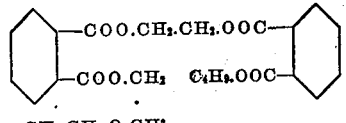

A similar mixed ester may be prepared according to the latter procedure in which two different acid radicles are present in the ester, thus, a citric acid residue may replace one of the phthalate groups.

I have found by experimentation that the new compounds described are excellent solvents for plastic materials. The low vapor pressure of these compounds permits the formation of unusually stable combinations with plastic materials, making the new compounds valuable as softening and plasticizing agents. In general, these substances are adapted for use with nearly all types of plastic materials. A few of those plastics with which the invention is especially concerned are cellulose derivatives, such as cellulose acetate, cellulose nitrate, the cellulose ethers, and ether-ester cellulose derivatives, for example acetyl ethyl cellulose; vinyl resins, by which is meant resinous products resulting from the polymerization of certain vinyl compounds; phenol-aldehyde resins; urea-aldehyde resins; resinous gums, such as ester gum; condensation products of polyhydric alcohols and polybasic acids; various natural resins, such as manilla, dammar, elemi and kauri resins; and other plastic materials and mixtures and modifications of the foregoing. The applications of the plasticized materials are varied and almost limitless, but some of the principal uses are in the formation of lacquers, films and solid plastic articles.

An example of a lacquer composition embodying the new compounds is as follows:

| | Parts by weight |
|---|---|
| Cellulose nitrate | 10 |
| Di-beta-butoxy ethyl ethylene glycol diphthalate | 5 |
| Ester gum | 10 |
| Solvent | 75 |

The solvent in the lacquer was made up as follows:

| | Parts by volume |
|---|---|
| Toluene | 40 |
| Butyl acetate | 40 |
| Butanol | 20 |

The dry film formed from this lacquer was found to have a substantially constant flexibility over a long period of time.

The use of the new mixed esters is not limited to the formation of lacquers, but is extended to the softening, plasticizing and modifying of plastic materials for all uses. By the proper choice of the starting materials the new esters may be made to possess practically any desired properties of vapor pressure, fluidity, and solvent power for various materials and for various uses.

I claim:—

1. Mixed esters in which the hydroxyl groups of a glycol of the group consisting of alkylene and polyalkylene glycols of the 1,2 series are reacted with the carboxyl group of an acid ester of a polybasic carboxylic acid and one of the group consisting of monoaryl and monoalkyl ethers of alkylene and polyalkylene glycols of the 1,2 series, said acid ester having one free carboxyl group.

2. Mixed esters in which the hydroxyl groups of a glycol of the group consisting of alkylene and polyalkylene glycols of the 1,2 series are reacted with the carboxyl group of an acid ester of a dibasic carboxylic acid and one of the group consisting of monoaryl and monoalkyl ethers of alkylene and polyalkylene glycols of the 1,2 series, said acid ester having one free carboxyl group.

3. Mixed esters in which the hydroxyl groups of a glycol of the group consisting of alkylene and polyalkylene glycols of the 1,2 series are reacted with the carboxyl group of an acid ester of phthalic acid and one of the group consisting of monoaryl and monoalkyl ethers of alkylene and polyalkylene glycols of the 1,2 series.

4. Process which comprises reacting the hydroxyl groups of a glycol of the group consisting of alkylene and polyalkylene glycols of the 1,2 series with the carboxyl group of an acid ester of a polybasic carboxylic acid and one of the group consisting of monoalkyl and monoaryl ethers of alkylene and polyalkylene glycols of the 1,2 series, said acid ester having one free carboxyl group.

5. A mixed ester in which both hydroxyl groups of ethylene glycol are reacted with the carboxyl group of the acid ester of phthalic acid and beta-butoxyethyl alcohol.

6. A mixed ester in which both hydroxyl groups of diethylene glycol are reacted with the carboxyl group of the acid ester of phthalic acid and beta-ethoxyethyl alcohol.

RALPH B. FRAZIER.